Jan. 16, 1962  A. N. LINDMARK  3,016,989
ELEVATOR PLANT AND ITS GUIDE RAILS
Filed Dec. 16, 1958  9 Sheets-Sheet 3

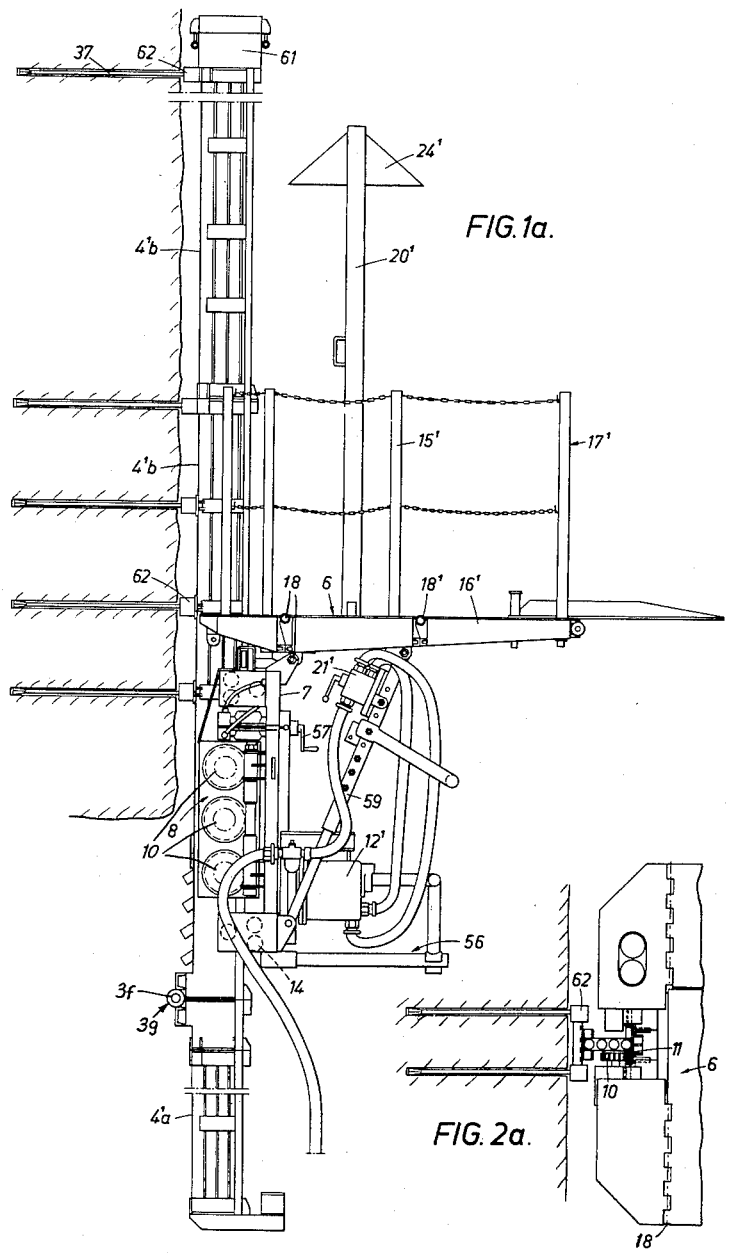

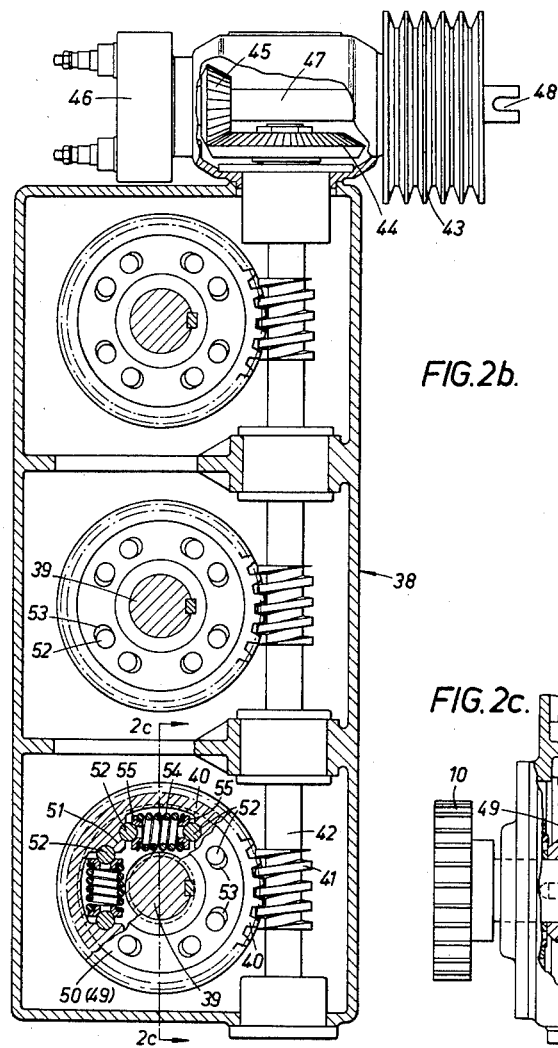
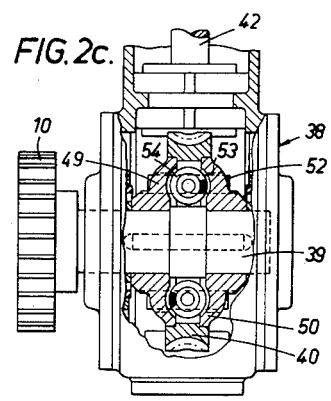
FIG.2b.
FIG.2c.

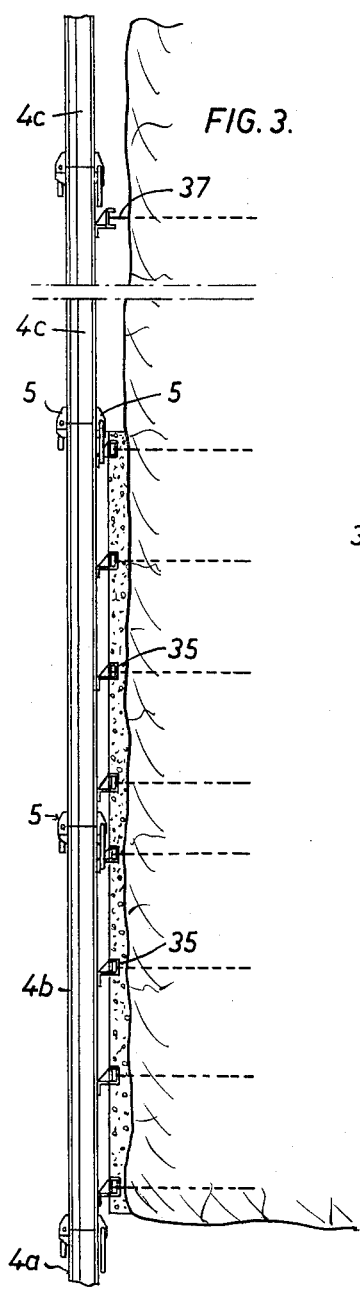
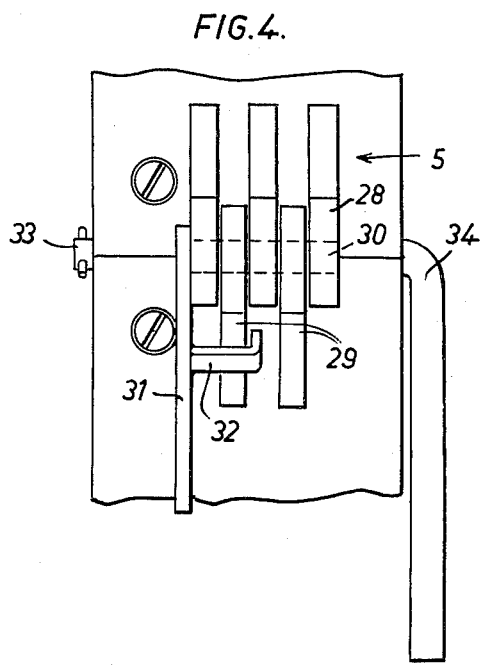

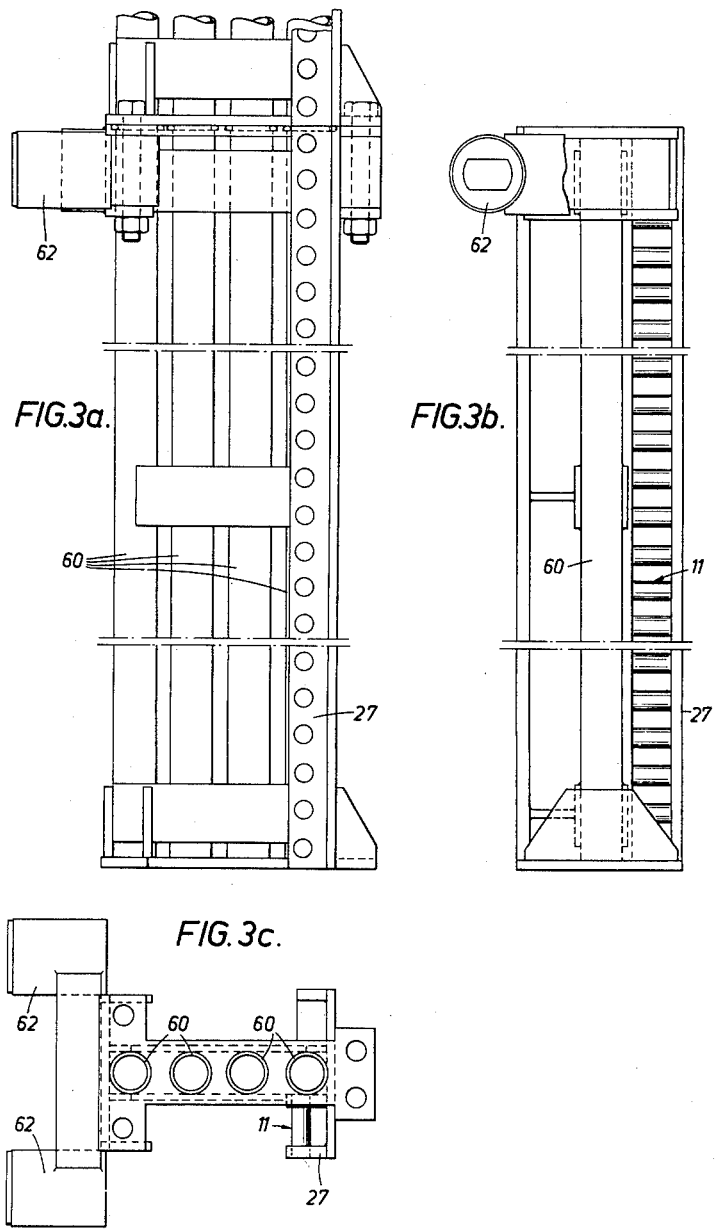

Jan. 16, 1962  A. N. LINDMARK  3,016,989
ELEVATOR PLANT AND ITS GUIDE RAILS
Filed Dec. 16, 1958  9 Sheets-Sheet 7

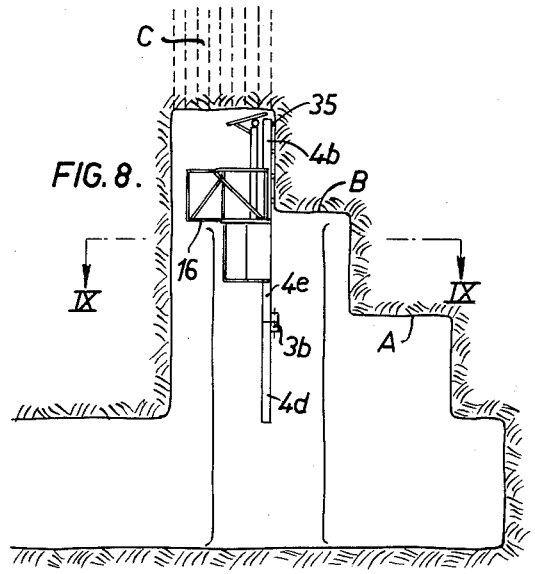
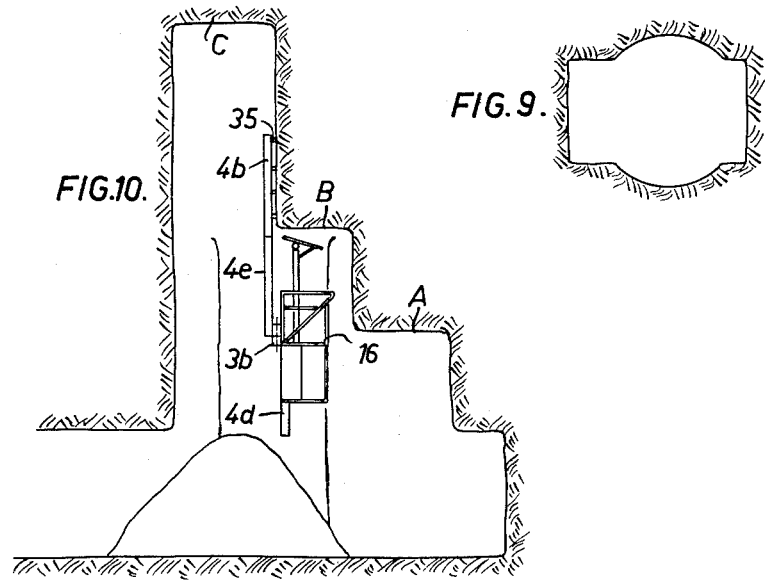

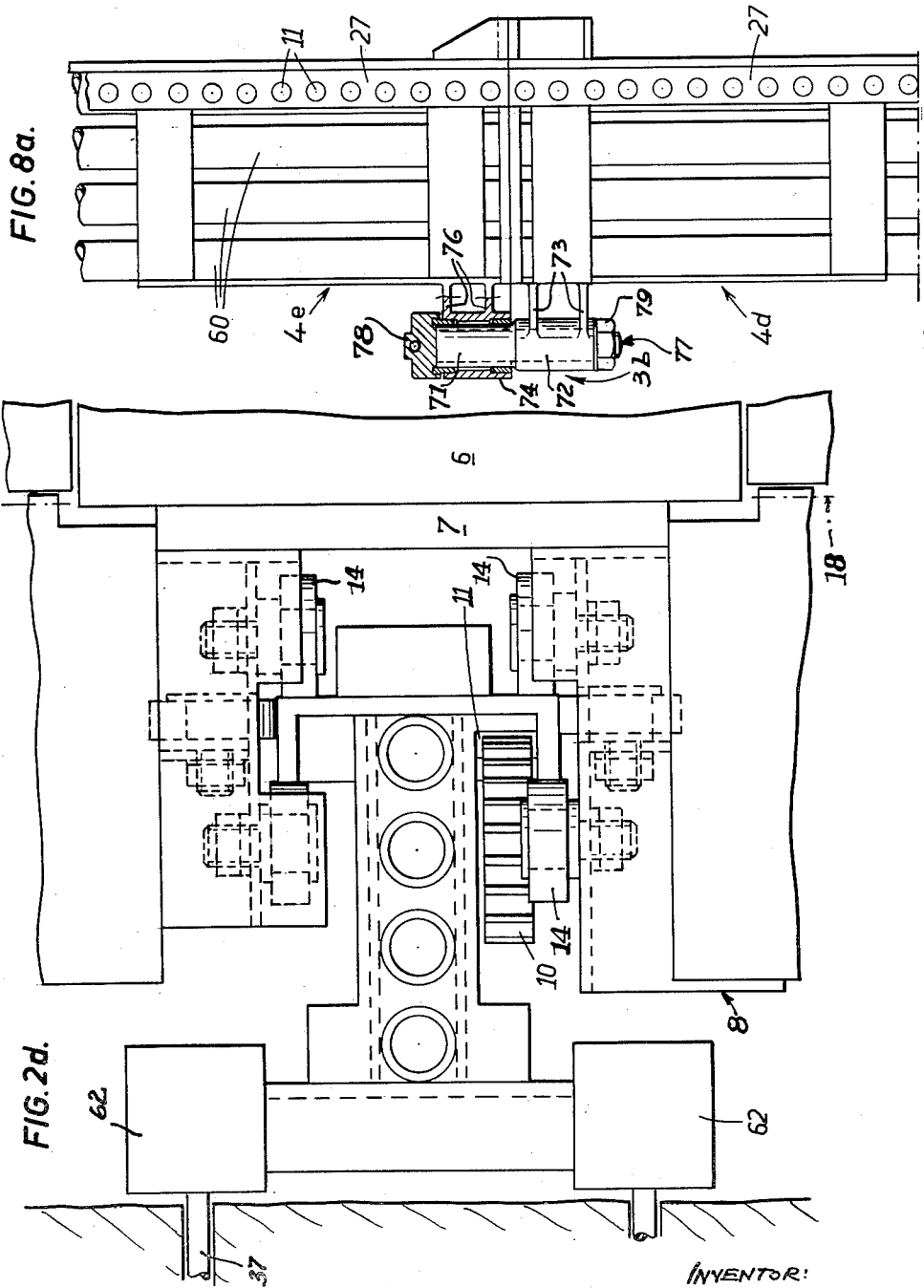

United States Patent Office 3,016,989
Patented Jan. 16, 1962

3,016,989
ELEVATOR PLANT AND ITS GUIDE RAILS
Alvar N. Lindmark, Strandgatan 24, Skelleftea, Sweden
Filed Dec. 16, 1958, Ser. No. 780,704
Claims priority, application Sweden Dec. 18, 1957
7 Claims. (Cl. 187—19)

The present invention relates to elevators having a drive mechanism cooperating with a rack.

The object of the invention is to provide an elevator of said type suitable for passenger and load transport and easy to mount for stationary or temporary use in loading plants, building cranes or scaffolds, antenna towers and in undeground or mine works, such as shaft sinking or driving a raise. The invention is for this purpose characterized by the fact that the guide-rail supporting the elevator platform is equipped with the rack and comprises preferably short sections connectible to each other and corresponding in length to a multiple of the pitch of said rack.

Another object of the invention is to provide means for easily mounting and dismounting the elevator platform from its guide-rail and transportation of the same.

Still another object of the invention is to provide means for temporarily moving the elevator platform out of the region normally occupied by elevator to make said space accessible or for protecting of the platform.

To obtain these objects the end section of the guide-rail is removably connected to the adjacent one and adapted to be temporarily secured to a carrier trolley. Said end section may on the other hand be pivotally connected to the adjacent section, so that the end section can be swung about an axis either parallel or at right angle to the guide-rail. This is of special importance when driving a raise. Thus, at blasting the elevator platform need not be entirely removed but may be swung to a position below a protecting roof of a rock excavation.

Still another object of the invention is to provide a guide-rail, in which the rack is protected against damage in a suitably formed channel in the guide-rail. A cleaning jet may be provided on the elevator platform to keep the rack clean from deposits and wearing dust.

Another object of the invention is to provide a guide-rail comprising as carrying structure a group of parallel tubes adapted each when assembling the sections to form a continuous conduit through which driving and cleaning medium may be supplied for tools and the like used on the elevator platform.

Still another object of the invention is to provide a drive mechanism adapted to cooperate with said guide-rail built up from rack-equipped guide-rail sections, said drive mechanism arranged to take up irregularities in pitch of said rack. Such irregularities may be due to wear of the teeth or deposits thereon and at the connection points of the sections.

The invention also relates to a method of driving underground excavations by means of said elevator plant.

Other objects and advantages of the present invention should be readily apparent by reference to the following specification considered in conjunction with the accompanying drawings forming a part thereof and it is to be understood that any modification may be made in the exact structural details there shown and described within the scope of the appended claims, without departing from or exceeding the spirit of the invention.

In the drawings:

FIGURE 1a is a side elevational view of a modified embodiment of the elevator structure.

FIGURE 2a is a partial plan view of a modified elevator platform shown in FIGURE 1a.

FIGURE 2b is a longitudinal sectional view of a driving mechanism.

FIGURE 2c is a part sectional view of the driving mechanism shown in FIGURE 2b but seen at right angle thereto.

FIGURE 2d is a fragmentary plan view partly in section showing details, on a larger scale, of FIG. 2a.

FIGURE 3 is a side elevation view of a guide-rail secured to a wall of a rock formation.

FIGURES 3a and 3b are side views seen at right angle to each other of a modified embodiment of a guide-rail.

FIGURE 3c is an end view of the guide-rail in FIGURE 3.

FIGURE 4 is a detail view of coupling means between guide-rail sections.

FIGURES 5–10 are schematic views showing the method of using the elevator structure for driving a raise.

Figure 1:
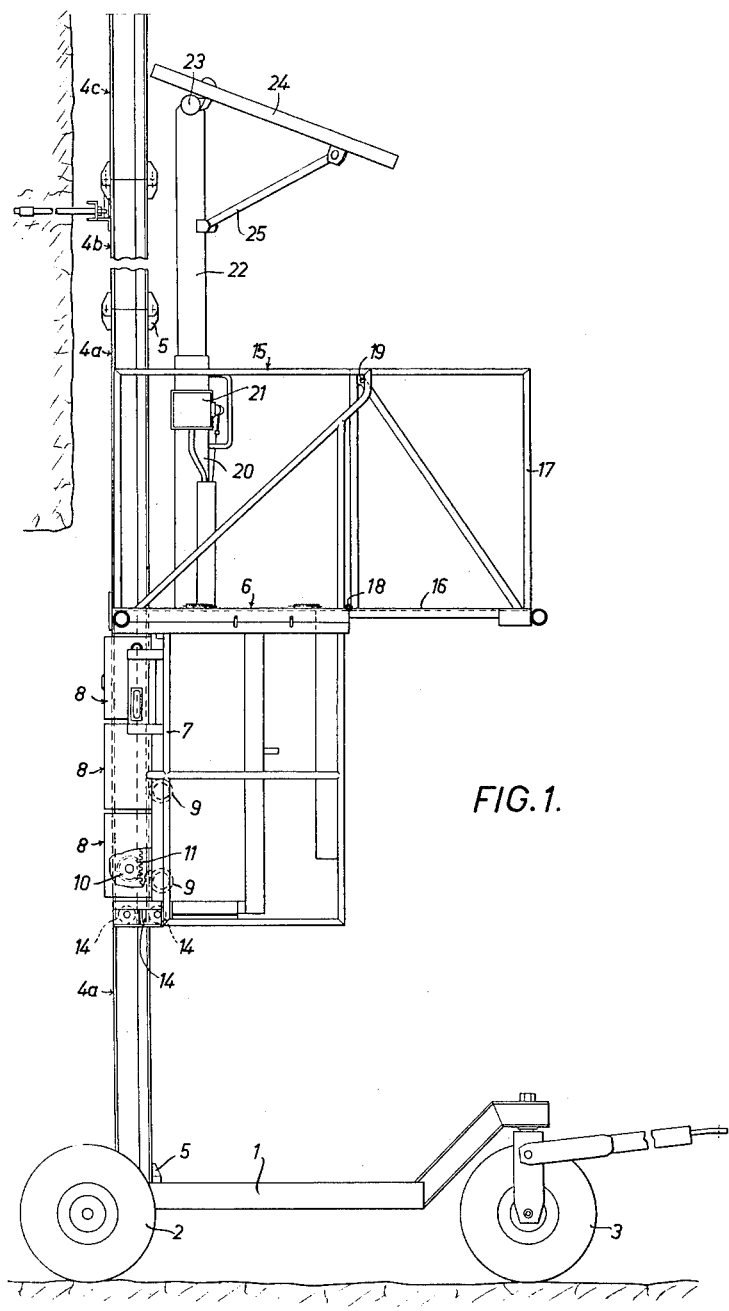
FIGURE 1 is a side elevational view of an elevator structure according to the invention.

In the drawings 1 is a trolley frame having at one end thereof a pair of wheels 2 and at the other end a steerable wheel 3. The trolley frame forms a support for a guide-rail section 4a.

The guide-rail 4 for the elevator comprises relatively short sections (FIGURE 3) adapted to be secured to each other and to a wall of a building structure or a rock formation.

In FIGURES 1 and 3 guide-rail sections 4b and 4c are shown bolted to the wall of a shaft or raise. The lowermost section 4a is free from the wall and only secured to the adjacent guide-rail section 4b by means of suitable coupling means 5 for a purpose described in the following.

An elevator platform 6 has a supporting frame 7 in turn supported by a driving mechanism 8 having three driving or "climbing" gears 10 cooperating with a rack 11 secured to the guide rail 4. The elevator frame and platform is adapted to be supported together with the driving mechanism by said guide-rail 4.

The length of each guide-rail section 4a, b, c etc. corresponds according to the invention to a multiple of the pitch of said rack to form when assemblied a continuous rack path.

The drive mechanism 8 comprises a rigid housing 38 (FIGURES 2b and 2c) in which three parallel shafts 39 are mounted on fixed distances relative to each other. The shafts 39 extend through the wall of the housing 38 and support on the projecting ends the climbing gears 10. Within the housing 38 the shafts 39 are provided with worm wheels 40, meshing with worm gears 41 on a common shaft 42. This shaft 42 extends through the whole housing 32 supported by bearing in the walls thereof and is driven from a driving shaft 47 by a bevel gearing including conical toothed wheels 44 and 45. The shaft 47 is provided with a pulley 43 at its one end, said pulley 43 is driven by a belt 13 (FIGURE 2) from a motor 12. A disc brake 46 is provided on the opposite end of the driving shaft 47. A grip 48 for a hand-crank 57 (see also FIGURE 1a) is provided at the outer end of the driving shaft 47.

To permit the climbing gears 10 to be angularly displaced within predetermined limits relative to the worm wheels each worm wheel 40 comprises a toothed ring freely rotatably mounted between two opposite flanges 49, 50 of a hub assembly secured to the shaft 39 of the climbing gears 10. The toothed ring 40 has inwardly projecting heads 51 arranged in spaced relation around its inner periphery. The opposite radial surfaces of the heads 51 form seatings for pins 52. The pins 52 are inserted in holes 53 in the opposite flanges 49, 50 of the hub assembly. Said holes 53 have an elongated shape in the peripheral direction of the flanges 49, 50. A compression spring 54 is inserted in each space between two pins 52 resting against opposite surfaces of adjacent heads 52 of the ring 40. Seat members 55 are further inserted between the spring 54 and the respective pin 52 to maintain the spring in place.

By this arrangement the several climbing gears 10 may take up any of a plurality of angular positions relative to each other without affecting the worm gearings 40, 41. If one climbing gear 10 and its shaft 39 together with the flanges 49, 50 is angularly moved relative to its associated worm wheel or toothed ring 40, one of the pins 52 of each spring assembly 54, 55 is moved out of engagement with the end walls of its associated holes 53 against the pressure force of the spring 54, thereby taking up a changed angular position relative said worm wheel ring 40.

The worm gearings 41, 42 are suitably of the self-locking type to prevent the elevator to move when the motor is stopped.

At the upper and lower ends of the frame 7 groups of guide rollers 14 are provided, the rollers 14 of each group cooperating in pairs to effect a guiding of the elevator frame and platform in any direction. Guide rollers 9 serve to guide the driving mechanism relative to the guide-rail.

The elevator platform 6 is suitably provided with a railing comprising fixed and foldable parts 15 and 16, 17 respectively, whereby said platform may be enlarged for a purpose described in the following. Said foldable parts comprise a preferably open-work plane 16 foldable about a hinge 18 and a lattice-railing 17 forming a side barrier and engaging the fixed part 15 of the railing by means of a stud 19.

FIGURE 1a shows a somewhat simplified arrangement with substantially the same elements as shown in FIGURE 1, said elements having added a prime sign to their reference numbers in said FIGURE 1a.

The device according to FIGURE 1a has a collapsible seat 56 provided under the platform 6. Control means 21' for the elevator are located within reach for the driver sitting on the seat 56. Said control means 21' control in this case the supply of compressed air to a driving motor 12'. A winch 57 for operating the drive mechanism by hand is provided on the driving shaft 47 of said mechanism as mentioned above. The platform 6 is pivotable about a shaft 18 so that it may take up a horizontal position in any degree of inclination of the guide-rail 4. This adjustment is effected by adjustable platform struts 59.

According to FIGURE 1 the frame 7 supports a pillar 20 at its upper plane, on which pillar control means 21 for the drive mechanism 8, 12 are secured. The pillar 20 has an extensible part 22 supporting at its upper end an adjustable protecting shelter 24. An arm 25 retains the shelter in desired position. According to FIGURE 1a the shelter is formed as a cap 24'.

Figure 2:
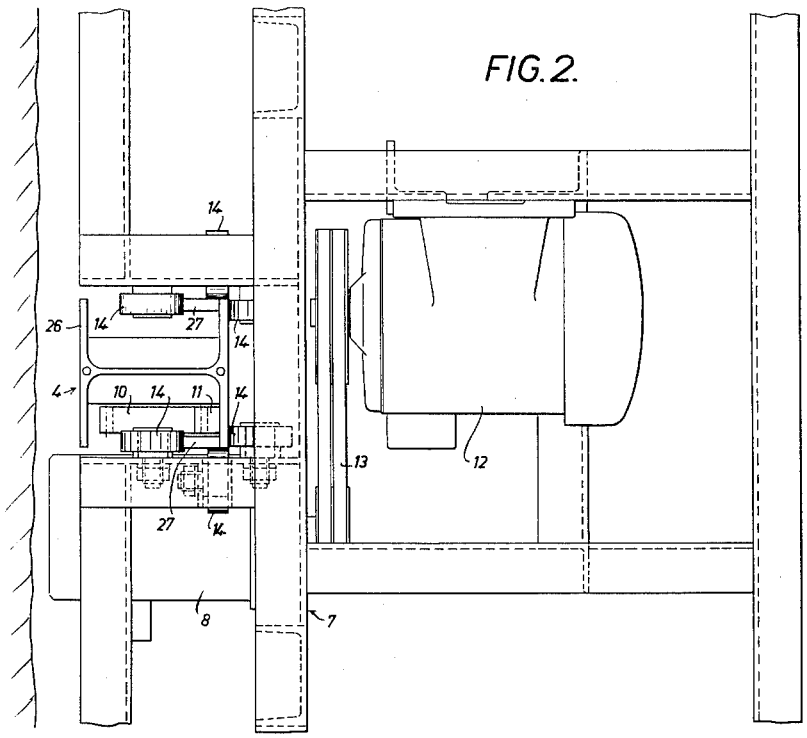
FIGURE 2 is a plan view of an elevator platform.

Each guide-rail section 4 comprises according to FIGURE 2 a substantially I-shaped beam 26 provided with flat iron bars 27 at the edges of one of its flanges and secured at right angle thereto. The bars 27 serve on one hand to form tracks for some of the guide rolls 14 (FIGURE 2) and form on the other hand together with the web of the I-beam a channel in which the rack 11 is located. Thereby said rack is essentially protected against damage. Said rack 11 may comprise either a machined gear-rack or may be built up by pins. A chain may also serve as rack.

The guide rail 4 may also be built up of tubes 60 as shown in FIGURES 3a–c. Said tubes are adapted to be tightly secured to each other at the connections of the respective sections so as to form each a separate conduit for water or compressed air. A head-box 61 covering the top section is adapted to be tightly secured to said upper section and includes air couplings for compressed air and water flexible tubes leading to tools used on the platform in elevated positions. Said head box 61 may also include a jet for ventilation of the raise after blasting. The head box 61 also serves as protecting means for the top of the guide-rail.

Preferably attaching ears 62 are provided at one end of each guide-rail section 4 (see also FIGURE 2a) for securing the same to the wall by bolts.

As shown in FIGURES 3 and 4 the guide-rail sections are connected to each other for instance by means of couplings 5 comprising interengaging ears 28, 29 respectively and locked to each other by a locking bolt 30 provided with a handle 31 having a finger 32 thereon engaging between two adjacent ears 29 to prevent the locking bolt 30 to accidently be moved sideways in its locked position. An angular locking bolt 34 may be provided at the rear side of the guide-rail 4 and secured in place by a pin 33.

Suitably the locking bolts 30 and 34 have a flattened cross section to permit the bolts to be inserted in the holes even if the same are not exactly in register with each other, for instance in the longitudinal direction of the guide-rail. When inserting the locking bolts 30, 34 into the holes of the ears with the flattened sides of the bolts at right angles to the guide-rail said holes are brought into register with each other by turning said bolts a quarter of a turn. Thereby the ears are moved towards each other and press the ends of the rail sections tightly against each other.

When using the elevator structure for driving a raise a method according to the invention may be used as schematically shown in FIGURES 5–10.

Figure 5:
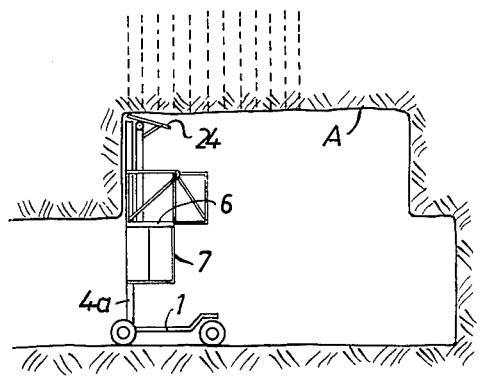
Figure 6:
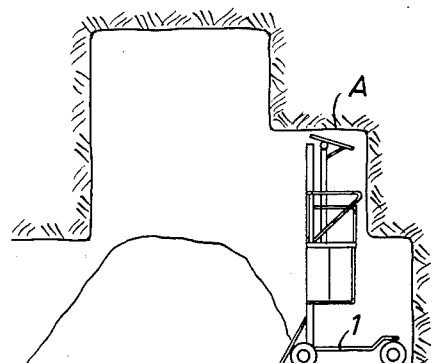

According to this method a space A is first drilled and blasted in the roof of a tunnel as shown in FIGURE 5. When drilling this space A the elevator platform 6 is supported by a guide-rail section 4a of suitable height mounted on the trolley frame 1. Then a recess B is drilled and blasted to a size suitable to leave a chamber (at A in FIGURE 6) large enough to cover the trolley and the drilling platform. Of course said protecting space may be arranged in any other suitable manner. When moved into said chamber the elevator is protected against downfalling stones at blasting.

Figure 7:
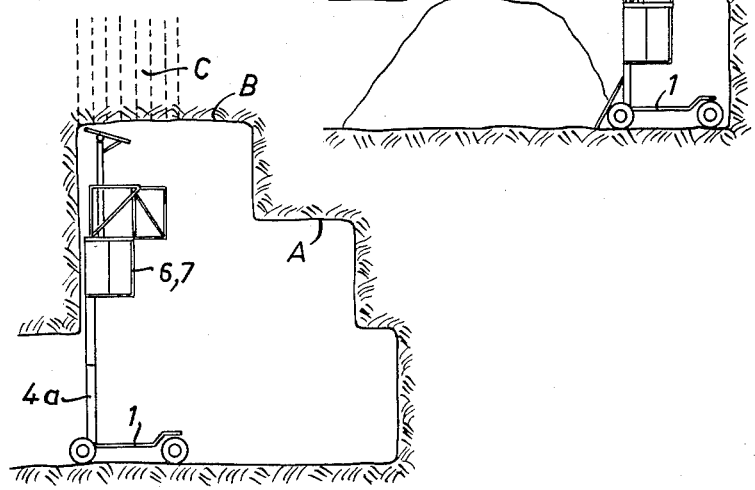

The roof of said recess B is further drilled as shown at C in FIGURE 7, said recess forming the final section of the raise to be driven. As shown in FIGURE 7 a portion of the roof at B is left unblasted to form a protecting chamber for the elevator platform in a manner described below.

To the wall of said raise C a guide-rail section 4b is mounted as shown in FIGURE 8. As best shown in FIGURE 3 a concrete sole is cast behind the guide-rail section 4b, in which sole said section 4b is rigidly mounted by means of several, e.g. four anchoring bolts 35.

When continuing the drilling and blasting of the raise C the trolley need not be used. A lower guide-rail section 4d (FIGURE 8) is in this case by means of a hinge 3b connected to the end portion 4e of the lowermost guide-rail section 4b secured to the wall of the raise C. The axis of the hinge 3b is parallel to the guide-rail so that when the elevator is lowered to said turnable section 4d the platform may be turned in under the protecting roof B. In order to permit this swinging movement of the platform unimpededly the section of the walls of the excavation below the roof B is enlarged as shown in FIGURE 9. Due to the fact that the portion 16 of the platform may be swung inwardly as shown in FIGURES 9 and 10 the space necessary for sheltering the platform is minimized.

Referring to FIG. 8a, the hinge connection 3b is shown to include a shaft 71 which is hollow and is secured, for instance by welding, to a lower sleeve 72 that is connected to the lowermost section 4d of the guide-rail by means of brackets 73. The shaft 71 is rotatably connected to an upper sleeve 74 that is secured to the guide-rail section 4e by means of brackets 76. The shaft 71 is rendered axially immovable relative to the upper sleeve 74 by means of a bolt 77 that has a head 78 and which penetrates through the hollow shaft 71 and is secured by means of a nut 79.

By this arrangement the area of the platform can be reduced so that possible falling stones striking the platform during its climbing movement or at cleaning strike the platform at a relatively short distance from the guide-rail or in other words the striking forces act on a short moment arm relative the guide-rail and guide rollers. Before swinging the platform by the guide-rail section 4d in position for climbing the part 16 of the platform is moved in over the rest of the platform as shown in FIGURE 10.

As the drilling and blasting continue the following guide-rail sections above that (4b) rigidly fixed to the concrete sole need only be secured at their upper ends of the wall of the raise (at 37, FIGURE 3) while their lower ends are held in place by engagement with the upper end of the next lower section. Thereby the guide-rail sections are easily mounted by one man single-handed.

It is further to be noticed that the axis 3f of the hinge connection 3g (corresponding to 3b) may also be horizontal to permit the lower section of the guide-rail together with the platform to be swung about said horizontal axis 3f in under a suitable shelter.

Moreover one and the same platform with its driving mechanism and guide means according to the invention may be used in connection with guide-rails mounted at various working places and mounted in various inclination relative to a vertical plane as the platform may be mounted on the trolley and transported to any desired place.

From the foregoing it is believed now apparent that there has been provided a new and useful elevator structure as well as a new and advantageous method of using said elevator structure.

I claim:

1. Elevator plant comprising an elevator platform having guide means engageable with a rack equipped guide-rail adapted to be suspended from an upright wall and being operable for guiding and supporting the platform movably thereon, driving means supported by said platform and provided with gears engaging with said rack for effecting ascending and descending movement of said platform at will, said guide-rail being built up of short sections, the lowermost end section of said guide-rail being turnable about an axis parallel with the guide-rail.

2. Elevator plant comprising an elevator platform having guide means engageable with a rack equipped guide-rail adapted to be suspended from an upright wall and being operable for guiding and supporting the platform movably thereon, driving means supported by said platform and provided with gears engaging with said rack for effecting ascending and descending movement of said platform at will, said guide-rail being built up of short sections, the lowermost end section of said guide-rail being turnable about an axis at right angle to the guide-rail.

3. Elevator plant comprising a rack-equipped guide-rail built up of short sections, each section comprising a body of tubes arranged longitudinally with the guide-rail, said tubes are adapted when mounting said guide-rail sections to be tightly connected each to form a separate conduit and means connectible with the end sections of said guide-rail and including coupling means for said tube conduits.

4. A guide-rail, for use in connection with an elevator installation for underground excavations, said guide-rail being composed of a series of interconnected elongated sections, each section including gear means and at least one tube for handling pressure fluid, said gear means and tubes forming a continuous gear means and tube, respectively, on the guide-rail.

5. A guide-rail section including means for interconnection to other similar guide-rail sections and having gear means and at least one tube for handling pressure fluid, said gear means and tube adapted to be aligned with similar gear means and tube of an adjoining section when interconnected thereto.

6. In an elevator plant, in combination, a guide-rail adapted to be supported uprightly adjacent an upright wall and composed of a plurality of endwise removably interconnected elongated sections defining at least one continuous tube operable to handle pressure fluid, and having lifting means, an elevator platform having guide means engaging said guide-rail for movable guiding of the platform on said guide-rail, and driving means engaging said lifting means and operable for raising and lowering said platform.

7. An elevator plant, for use adjacent an upright wall, comprising in combination a guide-rail adapted to be secured to said upright wall and to be entirely suspended therefrom and spaced therefrom for a small distance, said guide-rail being composed of a plurality of endwise interconnected elongated sections defining at least one continuous tube operable to handle pressure fluid, an elevator platform movably disposed on said guide-rail oppositely relative to said wall and having guide means engaging said guide-rail for upward and downward guiding of the platform, and driving means between said platform and said guide-rail operable to effect ascending and descending movement of said platform.

References Cited in the file of this patent

UNITED STATES PATENTS

| | | |
|---|---|---|
| 394,781 | Maurer | Dec. 18, 1888 |
| 1,356,281 | Hescock | Oct. 19, 1920 |
| 1,834,652 | Schmid | Dec. 1, 1931 |
| 1,888,018 | Shanafelt | Nov. 15, 1932 |
| 2,284,360 | Berby | May 26, 1942 |
| 2,514,498 | Kesler | July 11, 1950 |
| 2,531,346 | Schuchert | Nov. 21, 1950 |
| 2,780,448 | Core | Feb. 5, 1957 |
| 2,874,945 | McWhorter | Feb. 24, 1959 |

FOREIGN PATENTS

| | | |
|---|---|---|
| 143,985 | Australia | Oct. 26, 1951 |